(12) United States Patent
Vogel

(10) Patent No.: US 7,000,597 B2
(45) Date of Patent: Feb. 21, 2006

(54) FLAT GASKET

(75) Inventor: Werner Vogel, Burgoberbach (DE)

(73) Assignee: MAN Nutzfahrzeuge AG, (DE)

( * ) Notice: Subject to any disclaimer, the term of this patent is extended or adjusted under 35 U.S.C. 154(b) by 0 days.

(21) Appl. No.: 10/936,298

(22) Filed: Sep. 8, 2004

(65) Prior Publication Data
US 2005/0126541 A1    Jun. 16, 2005

(30) Foreign Application Priority Data
Dec. 12, 2003   (DE) ................................ 103 58 117

(51) Int. Cl.
F02F 11/00 (2006.01)

(52) U.S. Cl. ................... 123/472; 123/193.3; 277/313; 277/591

(58) Field of Classification Search ............. 123/41.74, 123/193.3, 195 A, 195 C, 198 E, 472, 549; 277/313, 591; 174/52.3, 59, 138 F, 138 G
See application file for complete search history.

(56) References Cited

U.S. PATENT DOCUMENTS

| | | | | |
|---|---|---|---|---|
| 4,387,690 A | * | 6/1983 | Chiavaroli | 123/549 |
| 4,415,044 A | * | 11/1983 | Davis | 174/59 |
| 4,480,608 A | * | 11/1984 | Valev | 123/195 C |
| 4,508,072 A | * | 4/1985 | Takami et al. | 123/195 C |
| 4,822,287 A | * | 4/1989 | Lanchet | 439/76.1 |
| 6,037,846 A | * | 3/2000 | Oberhammer | 333/182 |
| 6,129,485 A | * | 10/2000 | Grabe et al. | 405/152 |
| 6,259,060 B1 | * | 7/2001 | Prust | 123/549 |
| 6,524,120 B1 | * | 2/2003 | Zhao | 439/95 |

* cited by examiner

Primary Examiner—Willis R. Wolfe, Jr.
(74) Attorney, Agent, or Firm—Robert W Becker & Associates; Robert W Becker

(57) ABSTRACT

A flat gasket for sealing off a region, especially for sealing off a region bordered by a cylinder head cap, includes an elastic material that effects the sealing function and at least one pass-through region for passing through a conductor such that the conductor can extend, in the mounted condition of the flat gasket, from outside the region to be sealed off into the interior of such region. The flat gasket also includes a shaped tongue connected to the pass through region and extending into the region to be sealed off, the shaped tongue having opposed flat sides and being deformable at least vertically relative to the plane of the seal, and the tongue supporting on its flat sides at least one conductor guiding- and/or conductor securing-element.

15 Claims, 2 Drawing Sheets

FLAT GASKET

BACKGROUND OF THE INVENTION

The present invention relates to a flat gasket, especially for sealing off a cylinder head cap, whereby the flat gasket is completely or partially comprised of an elastic material that effects the sealing function, and the flat gasket comprises at least one pass-through region for at least one conductor, such conductor extending, in the mounted condition of the flat gasket, from outside the region to be sealed off into the interior of such region.

In many technical areas, especially, as well, in connection with engine manufacturing, it is necessary to seal off from one another regions that convey different media therethrough. As a consequence of the increased deployment of electronic, electrical, and electro-mechanical components, there frequently arises the need to guide electrical conductors and/or mechanical connections such as, for example, pipe conductors or Bowden cables, over those parting lines from one region to another region. The sealing off of the cylinder head of a combustion engine via a cylinder head cap is an example of one such event.

In connection with modern diesel motors having Common Rail fuel injection, electronically activated injection valves are deployed whose electrical connections are accessible via the cylinder head cap. In such cases, it is therefore necessary to guide the conductors for the control of the injection valves over the parting lines in the oil-conveying interior space, whereby, in the interior space, a fixed mounting of the conductors is necessary in order to prevent blank wearing away, disconnection, or tearing away of the conductors caused by moving parts such as, for example, a rocker arm.

To this end, it is already known from DE 101 05 625 A1 to integrate conductors into a seal that is comprised of a support element and an elastomeric seal profile enclosing the support element. The sleeve of the integrated conductor is thereby fixedly connected with the seal profile. In order to guide the conductor to both sides of the seal profile, the support element is permitted to project outwardly and the conductor is secured thereto.

With respect to such an arrangement, the disadvantage is incurred that the complete seal can no longer be used in connection with different electronic relationships or different relationships concerning the connection geometries, due to the integration of the conductor in the seal. Moreover, it is especially disadvantageous that the non-flexible projections of the support element are not suitable for rendering complicated layouts of conductors, in particular if the conductor layout deviates from the plane of the seal, whereupon resort must be had to conventional securement methods such as, for example, threaded fasteners.

SUMMARY OF THE INVENTION

The invention provides a solution to the challenge of overcoming the disadvantages stemming from the state of the art, in that there is provided a flat gasket with at least one pass through region for at least one conductor so that the assembly components for the conductor layout are integrated in the flat gasket, and the flat gasket, in spite of the complicated conductor layout that at least partially deviates from the plane of the seal, can be produced as a substantially flat component.

The advantage of the inventive arrangement is particularly to be found in the feature that, by reason of the deformability of the tongue, which is configured to support the conductor layout-and/or conductor securing-elements, the flat gasket is, on the one hand, configured as a substantially flat component, whereby the inventory storage and transport volumes of the flat gasket are kept to a minimum, and, on the other hand, the layout of the conductor in the desired form during the mounting of the flat gasket can be accomplished without undue effort.

BRIEF DESCRIPTION OF THE DRAWINGS

Further advantages are delineated in the hereinafter-following description of a flat gasket, as well as in the hereinafter-following description, having reference to the figures of the drawings, of the deployment of the flat gasket for sealing off a cylinder head cap. The drawings show.

DETAILED DESCRIPTION OF THE PREFERRED EMBODIMENT

Figure 1:
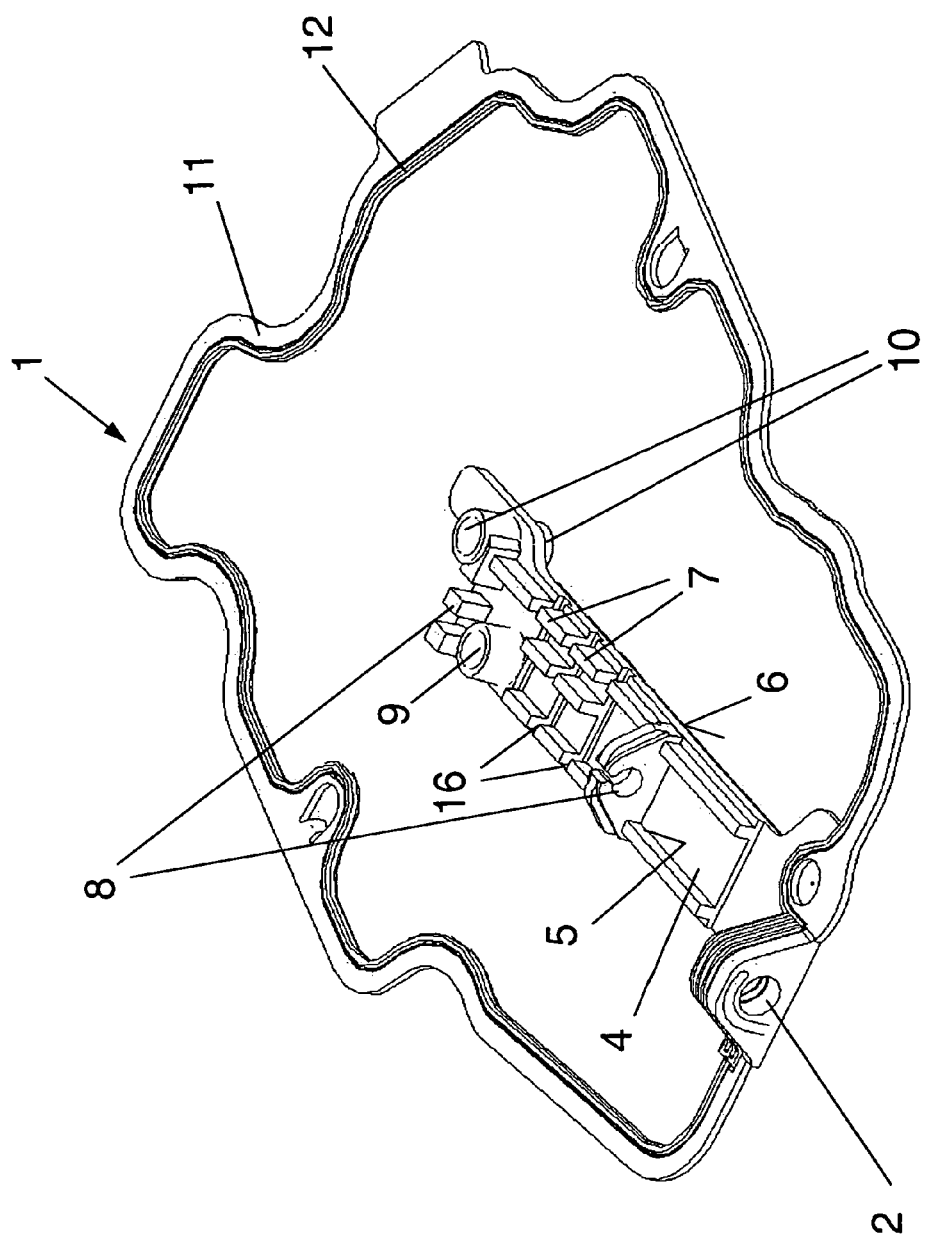
FIG. 1 is a perspective view of one embodiment of the flat gasket of the present invention.

The flat gasket 1 shown in FIG. 1 comprises a metal support 11 that conforms to the sealing contour on which is arranged, and on the side thereof facing the region to be sealed off, an elastomeric seal profile 12. Additionally, a pass through region 2 is arranged on the metal support 11 that is, as well, encircled by the elastomeric seal profile 12. A tongue 4 projecting into the region to be sealed off is connected directly to the pass through region 2 on the side of the flat gasket 1 facing the region to be sealed off, wherein, in the illustrated embodiment, the tongue is configured as a component integrally formed with the elastomeric seal profile 12 although this can be formed, as well, as a portion of the metal support 11, this latter configuration being described in more detail hereinafter.

Guide bars 7 and clamping bars 8 are arranged on a first flat side 5 of the tongue 4, these being integrally formed with the tongue 4 but which can be, alternatively, also configured to be secured to the tongue.

As noted, the tongue 4 is configured as a component integrally formed with the elastomeric seal profile 12, whereupon the tongue exhibits, as does any conventional elastomeric component, a high degree of flexibility and deformability, which can be further reinforced by grooves 16 extending transversely across the tongue 4 transverse to the direction of the so-provided conductor layout, such grooves permitting an even better deformability.

Additional cylinder-shaped securement pins 9, 10 are provided on the tongue 4, which, in the mounted condition of the flat gasket 1, serve as securement points. The cylinder-shaped securement pins 9, 10 are, as well, coaxially aligned both on the first flat side 5 as well as on the second flat side 6 of the tongue, whereby the portions disposed on the second flat side 6 assume the function of bearing bolts and can be secured via screws (not illustrated) provided on the first flat side 5.

As noted, the tongue 4, in a variation of the embodiment illustrated in FIG. 1, can also be configured as a component of the metal support 11 of the flat gasket 1. In this configuration, the guide bars and clamping bars can be configured as fishplate cut free of the tongue and bent out of the plane of the tongue. It is self-evident that, additionally, it is also possible to secure the guide bars and clamping bars to the tongue which is especially advantageously achieved via injection of the material that is also used for the seal profile directly onto the tongue or injection of the material around the tongue, so that the guide bars, clamping bars, and the seal profile are created in a single process step.

In order to achieve, with the tongue 4 integrally formed with the metal support 11, the requisite easy deformability of the tongue, the tongue can be so weakened via notches, constrictions, embossments, or cut-aways that the desired deformability occurs.

Figure 2:
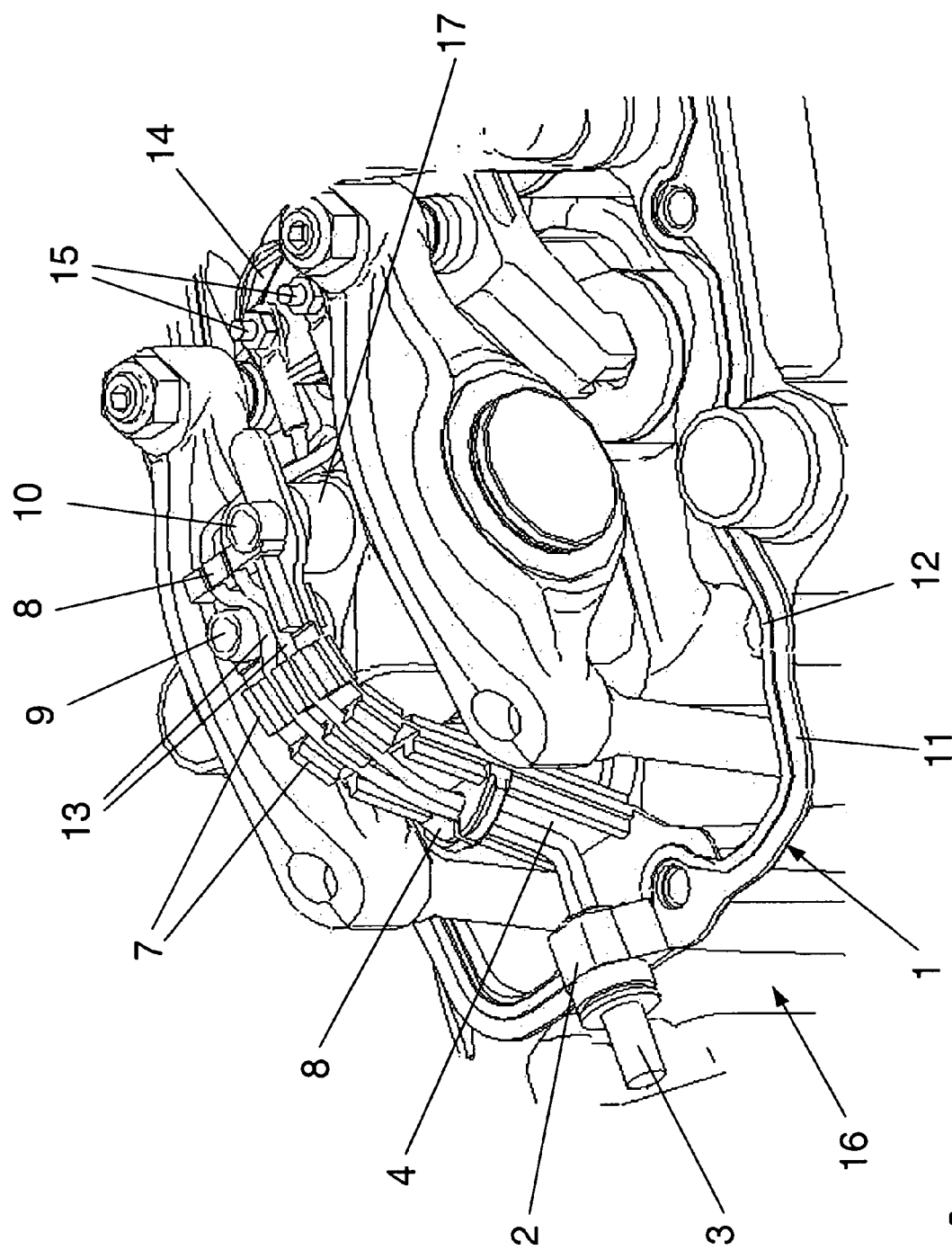
FIG. 2 is a perspective view of an embodiment of the flat gasket of the present invention disposed upon a cylinder head cap for providing a sealing off function relative thereto.

An advantageous deployment of the inventive flat gasket for sealing off a cylinder head cap is shown in FIG. 2.

A flat gasket of the type described in connection with FIG. 1 is disposed on the edge of the opening of a cylinder head to be sealed off. The tongue 4 formed in the pass through region 2 of the elastomeric seal profile 12 is bent upwardly out of the plane of the seal and is secured via securement pins 9, 10 on the corresponding cylinder-head side bearing points 17. A conductor 3 extends through the pass through region 2 into the interior of the region to be sealed off, wherein two conductors 13 individually enclosed within the conductor 3 are secured in the clamping steps 8 of the tongue 4 and are guided between the clamping steps 8 via the guide bars 7. The conductors 13 are guided from the end of the tongue 4 to a fuel injection valve 14 and secured to the connection clamps 15 of the fuel injection valve.

As can be seen in FIG. 2, the conductors 13 are securely guided into the region of the moveable parts disposed in the cylinder head so that damage to the conductors 13 via blank wearing away, disconnection, or tearing away can be prevented.

It is self-evident that, in connection with the inventive flat gasket, it is also possible for one of skill in the art to configure substantially more complicated conductor guides. If, as previously described, the tongue 14 is integrally configured with the metal support, even a securement of the tongue 4 on the cylinder head can be omitted because the tongue, in spite of its deformability, is configured of such a stiffness that the placement of the flat gasket under tension between the cylinder head and the cylinder head cap is sufficient to fix the tongue, and consequently, the conductor guide, in place.

As noted, the guides that are guided by means of the inventive flat gasket need not necessarily be electrical guides but also, obviously, other types of guides can be guided and secured in place such as, for example, guides for the transport of fluids or gasses—thus, pipe or hose guides—or guides for power transmission such as hydraulic or pneumatic guides or Bowden cables.

Many possibilities are available to one of skill in the art who, taking into account the described configuration of the flat gasket, makes use of commonly known construction principles, whereupon the foregoing flat gasket descriptions are only to be regarded as exemplary of the available configurations.

The specification incorporates by reference the disclosure of German priority document 103 58 117.0 filed Dec. 12, 2003.

The present invention is, of course, in no way restricted to the specific disclosure of the specification and drawings, but also encompasses any modifications within the scope of the appended claims.

What is claimed is:

1. A method of disposing a flat gasket relative to a cylinder head cap to effect sealing off of a region between a cylinder head and the cylinder head cap, comprising:

placing on the cylinder head cap to be sealed off a flat gasket having an elastic material that effects the sealing function, at least one pass-through region for passing through at least one conductor such that the conductor can extend, in the mounted condition of the flat gasket, from outside the region to be sealed off into the interior of such region, and a shaped tongue connected to the pass through region such that a portion of the flat gasket operable to effect the seal is disposed on the edge of the opening of the cylinder head cap;

guiding a jacketed electrical conductor that comprises at least two individually jacketed electrical conductors through the pass through region;

guiding the electrical conductors with the conductor guiding- and/or conductor securing-elements mounted on the tongue and the tongue being deformed such that the conductors are guided out of the plane of the seal to at least one connection clamp of at least one electrical load consuming component disposed in the region to be sealed off;

connecting the electrical conductors to the at least one electrical load consuming component disposed in the region to be sealed off; and placing the cylinder head cap in tension with the cylinder head, whereupon the region to be sealed off is closed via the flat gasket operable to effect the seal.

2. A method according to claim 1, wherein the at least one electrical load consuming component is an electrical activatable fuel injection valve.

3. An engine made by the process of:

providing an engine having a cylinder head and a cylinder head cap;

placing on the cylinder head cap a flat gasket having an elastic material that effects a sealing function for sealing off a region to be sealed between the cylinder head and the cylinder head cap, at least one pass-through region for passing through at least one conductor such that the conductor can extend, in the mounted condition of the flat gasket, from outside the region to be sealed off into the interior of such region, and a shaped tongue connected to the pass through region such that a portion of the flat gasket operable to effect the seal is disposed on the edge of the opening of the cylinder head cap;

guiding a jacketed electrical conductor that comprises at least two individually jacketed electrical conductors through the pass through region;

guiding the electrical conductors with the conductor guiding- and/or conductor securing-elements mounted on the tongue and the tongue being deformed such that the conductors are guided out of the plane of the seal to at least one connection clamp of at least one electrical load consuming component disposed in the region to be sealed off;

connecting the electrical conductors to the at least one electrical load consuming component disposed in the region to be sealed off; and placing the cylinder head cap in tension with the cylinder head, whereupon the region to be sealed off is closed via the flat gasket operable to effect the seal.

4. An engine according to claim 3, wherein the at least one electrical load consuming component is an electrical activatable fuel injection valve.

5. A flat gasket for sealing off a region, especially for sealing off a region between a cylinder head and a cylinder head cap, comprising:

an elastic material that effects the sealing function;

at least one pass-through region for passing through at least one conductor such that the conductor can extend, in the mounted condition of the flat gasket, from outside the region to be sealed off into the interior of such region; and a shaped tongue connected to the pass through region and extending into the region to be sealed off, the shaped tongue having opposed flat sides and being deformable at least vertically relative to the plane of the seal, and the tongue supporting on its flat sides at least one conductor guiding- and/or conductor securing-element.

6. A flat gasket according to claim 5, wherein the at least one conductor guiding- and/or conductor securing-element is a selected one of a clamping bar and a guide bar extending transversely to the conductor guiding direction on at least one flat side of the tongue.

7. A flat gasket according to claim 5 and further comprising a metal support on which is mounted, on the side thereof facing the region to be sealed off, an encircling elastomeric seal profile, whereby the elastomeric seal profile also comprises the pass through region for the at least one conductor and is integrally formed of the same material with the deformable tongue.

8. A flat gasket according to claim 5, and further comprising at least one securement element mounted on the tongue that serves to secure the tongue in the region to be sealed off.

9. A flat gasket according to claim 8, wherein the at least one conductor guiding- and/or conductor securing-element is a selected one of a clamping bar and a guide bar extending transversely to the conductor guiding direction on at least one flat side of the tongue.

10. A flat gasket according to claim 8, wherein the pass through region the deformable tongue, the at least one securement element, and the at least one conductor guiding- and/or conductor securing-element are integrally formed of soft elastic material.

11. A flat gasket according to claim 10, wherein the soft elastic material is an elastomer.

12. A flat gasket according to claim 5 and further comprising a flat metal support on which is mounted, on the side thereof facing the region to be sealed off, an encircling elastomeric seal profile, whereby the elastomeric seal profile also comprises the pass through region for the at least one conductor and the deformable tongue is integrally formed with the flat metal support and the deformability of the tongue is facilitated via at least one of material constrictions, notches, and free cutting.

13. A flat gasket according to claim 12, wherein the at least one conductor guiding- and/or conductor securing-element is a selected one of a clamping bar and a guide bar that is free cut from the tongue and is configured as a fishplate bent out of the plane of the tongue.

14. A flat gasket according to claim 12, wherein the at least one conductor guiding- and/or conductor securing-element is a selected one of a clamping bar and a guide bar and is comprised of a soft elastic material and secured to the tongue.

15. A flat gasket according to claim 14, wherein the flat gasket comprises a soft elastic material applied via a selected one of injection on the tongue and at least partial injection around the tongue the soft elastic material operating to secure the tongue to the flat gasket.

* * * * *